United States Patent [19]

Ishijima et al.

[11] 4,442,535

[45] Apr. 10, 1984

[54] FLUORESCENT X-RAY FILM THICKNESS GAUGE FOR VERY SMALL AREAS

[75] Inventors: Hiroshi Ishijima; Toshiyuki Koga, both of Tokyo, Japan

[73] Assignee: Seiko Instruments & Electronics Ltd., Tokyo, Japan

[21] Appl. No.: 360,909

[22] Filed: Mar. 23, 1982

[30] Foreign Application Priority Data

Apr. 7, 1981 [JP] Japan ............................... 56-49995

[51] Int. Cl.³ ............................................. G01B 15/02
[52] U.S. Cl. ......................................... 378/50; 378/89
[58] Field of Search ..................... 378/50, 44, 89, 48

[56] References Cited

U.S. PATENT DOCUMENTS 2,890,344  6/1959  Behr ..................................... 378/89

Primary Examiner—Alfred E. Smith
Assistant Examiner—T. N. Grigsby
Attorney, Agent, or Firm—Robert E. Burns; Emmanuel J. Lobato; Bruce L. Adams

[57] ABSTRACT

A fluorescent X-ray film thickness gauge has an X-ray source and a collimator for irradiating a sample with X-rays, and a detector for detecting fluorescent X-rays emitted by the sample. The detector has a cylindrical-shaped housing in which is formed a detector opening for receiving therethrough the fluorescent X-rays to be detected. The detector is rotatable or angularly displaceable about its longitudinal axis to adjust the position of the detector opening relative to the sample so as to effectively minimize variations in the intensity of the detected fluorescent X-rays due to variations in the distance between the sample and the detector.

10 Claims, 6 Drawing Figures

FLUORESCENT X-RAY FILM THICKNESS GAUGE FOR VERY SMALL AREAS

BACKGROUND OF THE INVENTION

The present invention relates generally to an improvement in a fluorescent X-ray film thickness gauge and, particularly to a gauge having means for minimizing variation in the detected fluroescent intensity X-ray caused by a change in the distance between a detector and a sample.

BRIEF DESCRIPTION OF THE DRAWINGS

FIG. 2 is an explanatory view illustrating the sensitivity of the detector of FIG. 1, in which

Figure 1:
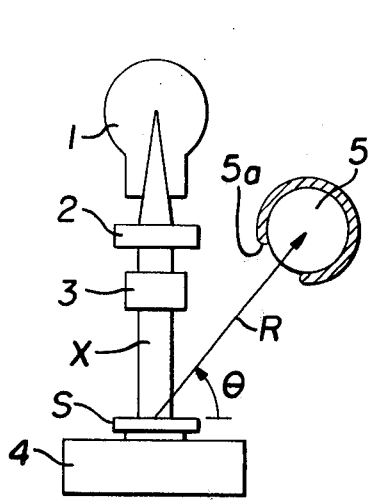
FIG. 1 is a schematic side view of a film thickness gauge according to the present invention.

Generally, a fluorescent X-ray film thickness gauge as illustrated in FIG. 1 has a radiation source 1 which is, for example, composed of an X-ray tube for generating excitation X-rays X, a shutter 2 for controlling the blocking and passing of the X-rays, a collimator 3 for focusing the X-rays into an X-ray beam, a sample table 4, a sample S disposed on the sample table 4 to be irradiated by the X-rays, and a detector 5 for receiving the fluorescent X-rays R emitted by the sample S which may be, for example, a proportional counter.

As well known in the art, the output signal from the detector 5 is a function of the film thickness and is applied to a computing circuit (not shown) for computing and displaying the film thickness of the sample S.

However, according to the arrangement described above, since the size of the sample S is generally not constant, the sample S necessarily changes in position upward or downward relative to the detector 5 as shown in FIG. 1. Consequently, the intensity of the fluorescent X-rays R detected by the detector 5 changes in inverse proportion to the square of the distance between the detector 5 and the sample S since the distance between the detector 5 and the sample varies due to the upward or downward change in position of the sample S. At the same time, the angle $\theta$ of incidence of the fluorescent X-rays R applied to the detector 5 changes. In this case, since the detector 5 has an opening portion 5a for receiving the fluorescent X-rays R, the detection sensitivity varies as illustrated in FIG. 2.

Figures 2A, 2B:
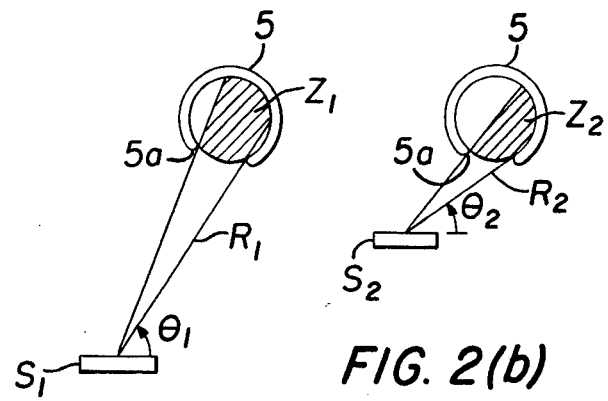
FIG. 2(a) is a view showing the case where the sample is at the upper position and FIG. 2(b) is a view showing the case where the sample is at the lower position.

The X-ray detection sensitivity of the detector 5 is high when the sample is positioned in the downward position as shown in FIG. 2(a) so that the angle $\theta_1$ of incidence is relatively large, since in this condition the detection region $Z_1$ for receiving the fluorescent X-rays $R_1$ from the sample $S_1$ is large. On the other hand, when the sample $S_2$ is positioned in the upward position as shown in FIG. 2(b) so that the angle $\theta_2$ of incidence is relatively small, since in this condition the detection region $Z_2$ for receiving the fluorescent X-ray $R_2$ becomes smaller, the detection sensitivity of the detector 5 is low.

Figure 3:
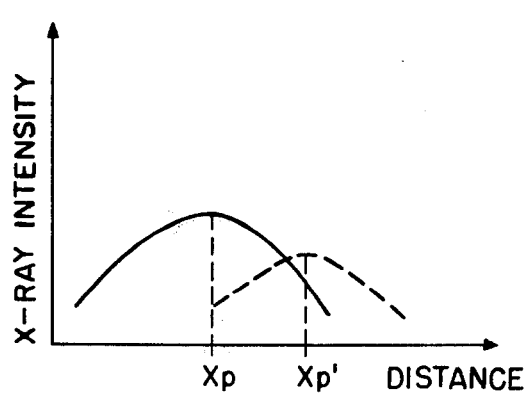
FIG. 3 is a characteristic curve showing the variation of the X-ray sensitivity relative to the distance from the sample.

Since the X-ray detection region for receiving the X-rays through the opening 5a of the detector 5 varies in accordance with the incidence angle $\theta$ and since the sensitivity is roughly proportional to the area of the detection region, the relationship between the intensity of the detected X-rays and the position of the sample S in the vertical direction, that is, the vertical distance of the sample from the detector 5, will be shown by FIG. 3. When the sample is positioned upward so that the distance betwen the sample and the detector 5 is shortened, the sensitivity of the detection is decreased since the intensity of the X-ray increases in accordance with the square of the distance from the sample and the incident angle "$\theta$" is small. On the other hand, when the sample is positioned at a lower position, the change of the intensity of the detection is cancelled by the change in the relative position of the detector 5. These characteristics are shown by the curve in FIG. 3 having a local maximum value $X_p$.

If the sample S is at the position corresponding to the local maximum value $X_p$ of the intensity curve of the detected X-ray, it is evident that the change in the intensity of the detection due to changes in the vertical distance becomes minimum. However, since the conventional device has no adjusting means, it is not possible to minimize the change of intensity in the detected X-ray.

The present invention intends to solve the drawbacks mentioned above, and an object of the present invention is to provide a fluorescent X-ray film thickness gauge, in which the direction of the detector opening facing the sample can be changed by rotation of the detector, the adjustment being possible in such a way that the set position of the sample is coincident with the local maximum value of the intensity of the detected X-ray, and the range of the change in the intensity of the detected X-ray due to the vertical change in the position of the sample is set so as to be minimum.

Figure 4:
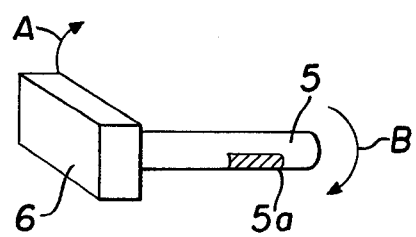
FIG. 4 is a perspective view of the detector of the present invention.

FIG. 4 is a preferred embodiment of a detector of the present invention, in which an opening 5a for receiving the fluorescent X-rays is defined at one portion of the circumferential surface portion of a cylindrical detector 5, and a circuit component comprised of a preamplifier 6 is integrally provided at one end portion thereof. As shown, the detector 5 has a cylindrical-shaped housing and the opening 5a is formed in the curved cylindrical surface of the housing. The housing of the preamplifier 6 is connected to one end of the detector 5. When the detector 5 and the preamplifier 6 are mounted to the body of a film thickness gauge (not shown), if the preamplifier 6 is rotated or angularly displaced by using the preamplifier 6 as a lever, the detector 5 is also rotated or angularly displaced at the same time, and the direction of the opening 5a relative to the sample can be adjusted.

Figure 5:
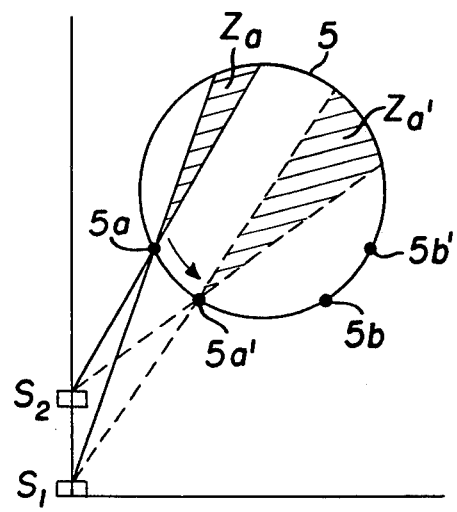
FIG. 5 is a schematic view showing the change in the peak position due to the rotation of the detection.

In this case, if the preamplifier is rotated in the direction shown by an arrow mark A of FIG. 4, the detector 5 will be rotated in the same direction about its longitudinal axis shown by an arrow mark B, so that the position of one end of the opening 5a is moved from the position 5a to the position 5a' in FIG. 5. As a result of the movement of the opening 5a, the detection region of the detector 5 which receive the fluorescent X-rays is changed from $Z_a$ to $Z_{a'}$ by the vertical motion of the sample S. That is, when the sample is moved in the vertical direction between $S_1$ and $S_2$, if the detector is rotated so as to move one end of the opening from the position 5a to 5a', the amount of the change of the detection region for receiving the X-ray is enlarged since the region $Z_a$ is changed to the region $Z_{a'}$. At the same time, the other end of the opening also moves from the position $5b$ to the position $5b'$, however, as will be seen from FIG. 5, the difference in the amount of change of the detection region in the vicinity of the other end caused by the vertical displacement of the sample is very small so that this small difference can be ignored.

Consequently, when the detector 5 is rotated in the direction shown by the arrow mark B, the amount of the change in the detection region of the detector 5, which is effected by the vertical motion of the sample, is changed from $Z_a$ to $Z_{a'}$ so that the degree of the cancellation (which is proportional to the amount of $Z_a$ and $Z_{a'}$) for the increase of the intensity of the X-ray caused by changing the sample from position $S_1$ to $S_2$ becomes large. As a result, the curve showing the intensity of the detected X-ray moves in the righthand direction and is changed from the curve indicated by the solid line in FIG. 3 to the broken line, and the local maximum value is changed from $X_p$ to $X_{p'}$.

When the detector 5 is rotated in the opposite direction to the arrow mark of FIG. 4, of course, the local maximum moves in the lefthand direction of the distance axis of FIG. 3.

Therefore, in the case that the detector 5 is mounted on the body of the apparatus (not shown), when the detector 5 is properly rotated or angularly displaced to obtain data in response to the change in the height of the sample S, it is possible to adjust the detector orientation in such a way that the intensity of the detected X-ray is at the maximum value at the set height position of the sample S.

As described above, according to the present invention, since the device is capable of setting the distance between the detector and the sample (the position of the sample) in such a way that the intensity of the detected fluorescent X-ray has a maximum value, it is possible to compensate for the deviation in the height of the sample table of the film thickness gauge. As a result, there is provided a film thickness gauge using fluorescent X-rays which is capable of minimizing the amount of the change in the intensity of the detected fluorescent X-rays.

We claim:

1. A fluorescent X-ray film thickness gauge comprising: a radiation source for generating an X-ray; a sample positioned during use of the gauge to be irradiated by the X-ray so as to emit a fluorescent X-ray; and a detector having an opening for receiving the fluroescent X-ray, characterized in that said detector comprises a cylindrical-shaped detector so arranged that it is possible to adjust the angular position of said detector by rotating it about its longitudinal axis in such a way that the position of said sample is coincident with a point at which the change amount in the detected intensity of said fluorescent X-ray is minimum.

2. In a fluorescent X-ray film thickness gauge having means for irradiating a film-coated sample with X-rays: detector means spaced from the sample for detecting fluorescent X-rays emitted by the sample and producing an output signal representative of the film thickness, said detector means having a longitudinal axis and being angularly displaceable about its longitudinal axis and having a detector opening for receiving therethrough the fluorescent X-rays emitted by the sample; and means for angularly displacing the detector means about its longitudinal axis to accordingly adjust the position of the detector opening relative to the sample so as to effectively minimize variations in the intensity of the detected fluorescent X-rays due to variations in the distance of the sample from the detecting means.

3. A fluorescent X-ray film thickness gauge according to claim 2; wherein the means for angularly displacing the detecting means comprises a lever connected to the detecting means.

4. A fluorescent X-ray film thickness gauge according to claim 3; wherein the lever comprises the housing of a circuit component connected to receive the output signal from the detecting means.

5. A fluorescent X-ray film thickness gauge according to claim 4; wherein the circuit component comprises a preamplifier.

6. A fluroescent X-ray film thickness gauge according to claim 2; wherein the detecting means has a generally cylindrical-shaped housing with the detector opening being formed in the curved cylindrical surface thereof.

7. A fluorescent X-ray film thickness gauge according to claim 6; wherein the means for angularly displacing the detecting means comprises a lever connected to the generally cylindrical-shaped housing.

8. A fluorescent X-ray film thickness gauge according to claim 7; wherein the lever is connected to one end of the housing.

9. A fluorescent X-ray film thickness gauge according to claim 7; wherein the lever comprises the housing of a circuit component connected to receive the output signal from the detecting means.

10. A fluorescent X-ray film thickness gauge according to claim 9; wherein the circuit component comprises a preamplifier.

* * * * *